Figure 1:
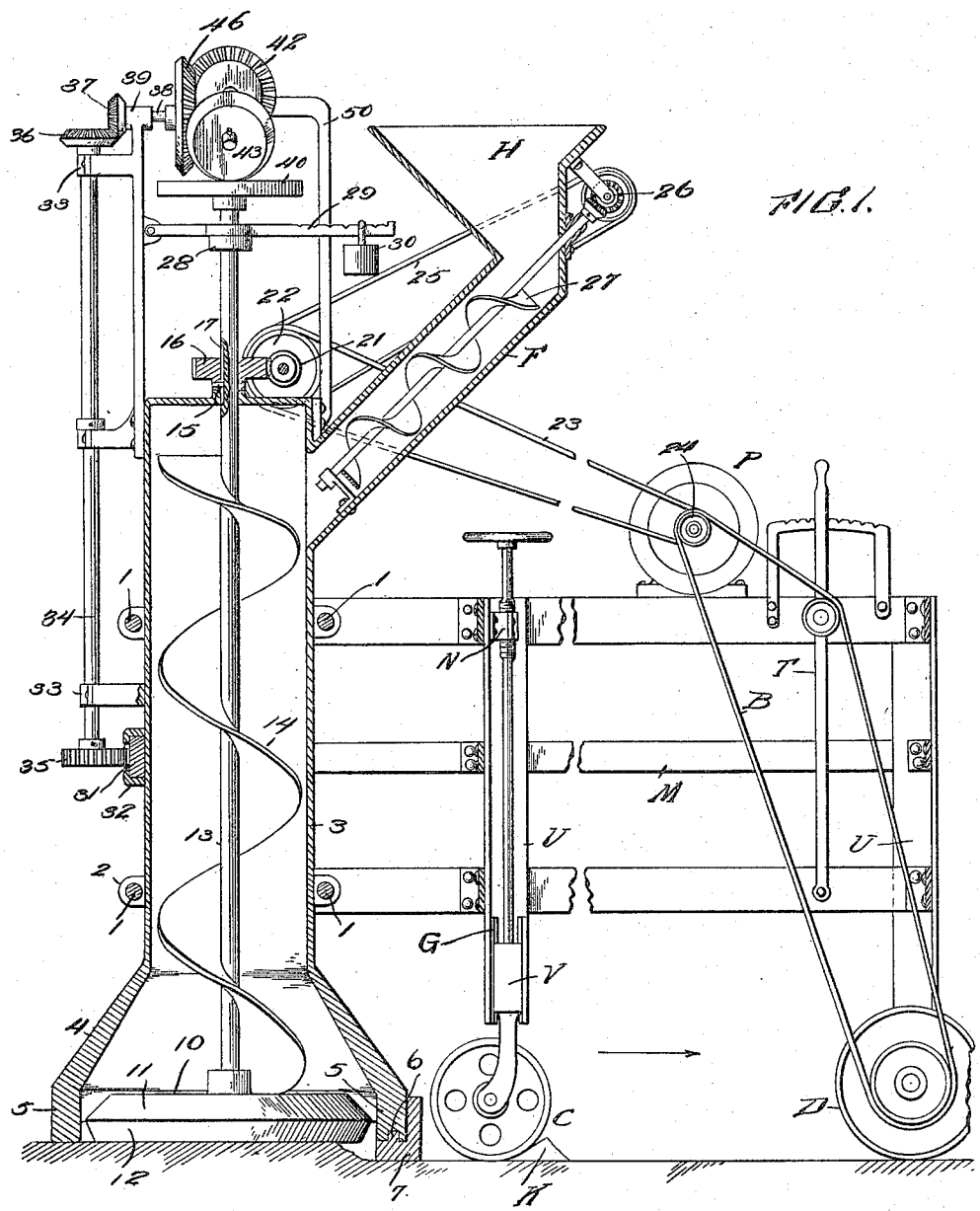

J. O. FRAISHER.
MACHINE FOR SPREADING ASPHALT, &c.
APPLICATION FILED MAY 11, 1915.

1,193,459.

Patented Aug. 1, 1916.
3 SHEETS—SHEET 1.

Inventor
Justus O. Fraisher

Witnesses

By Mason Fenwick & Lawrence,
Attorneys

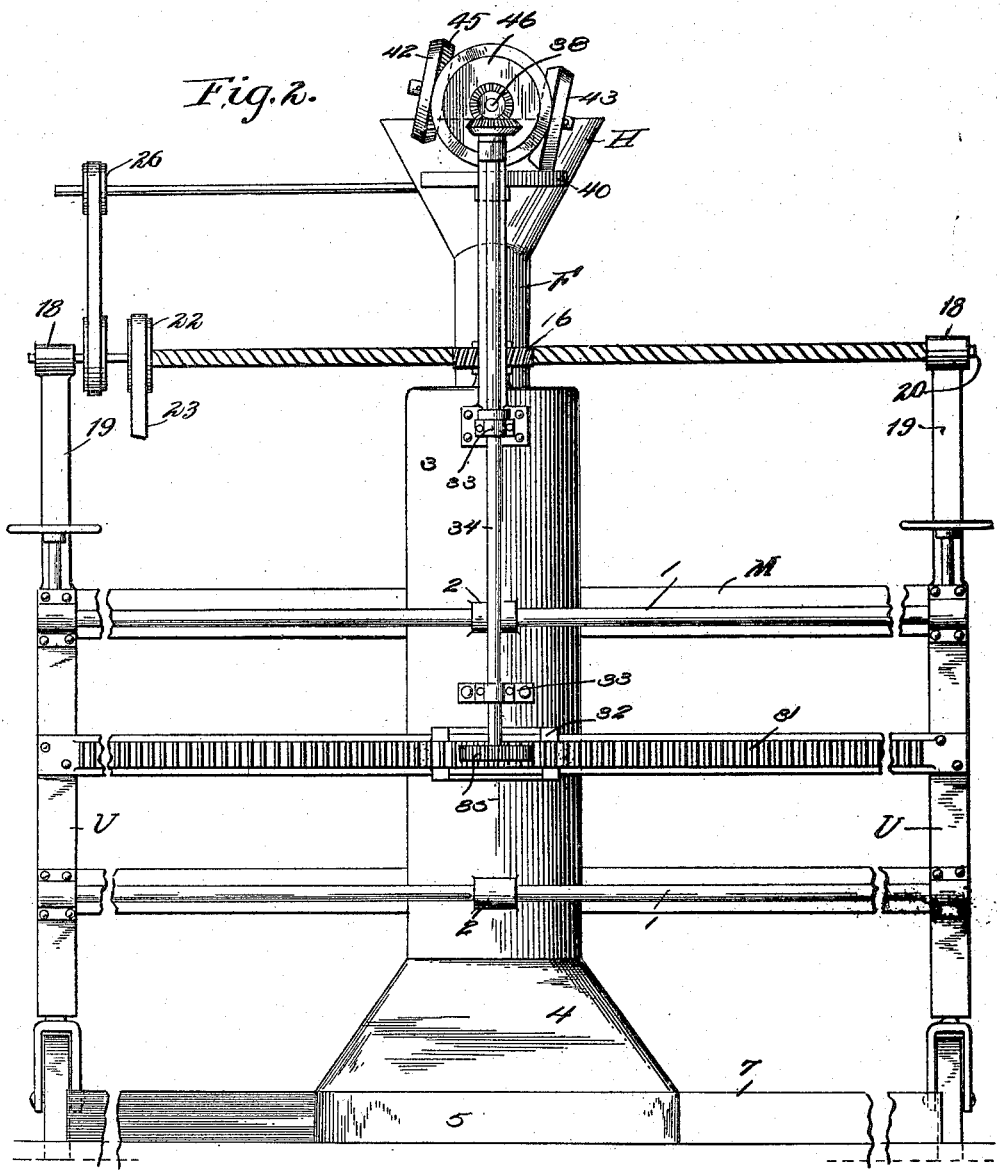

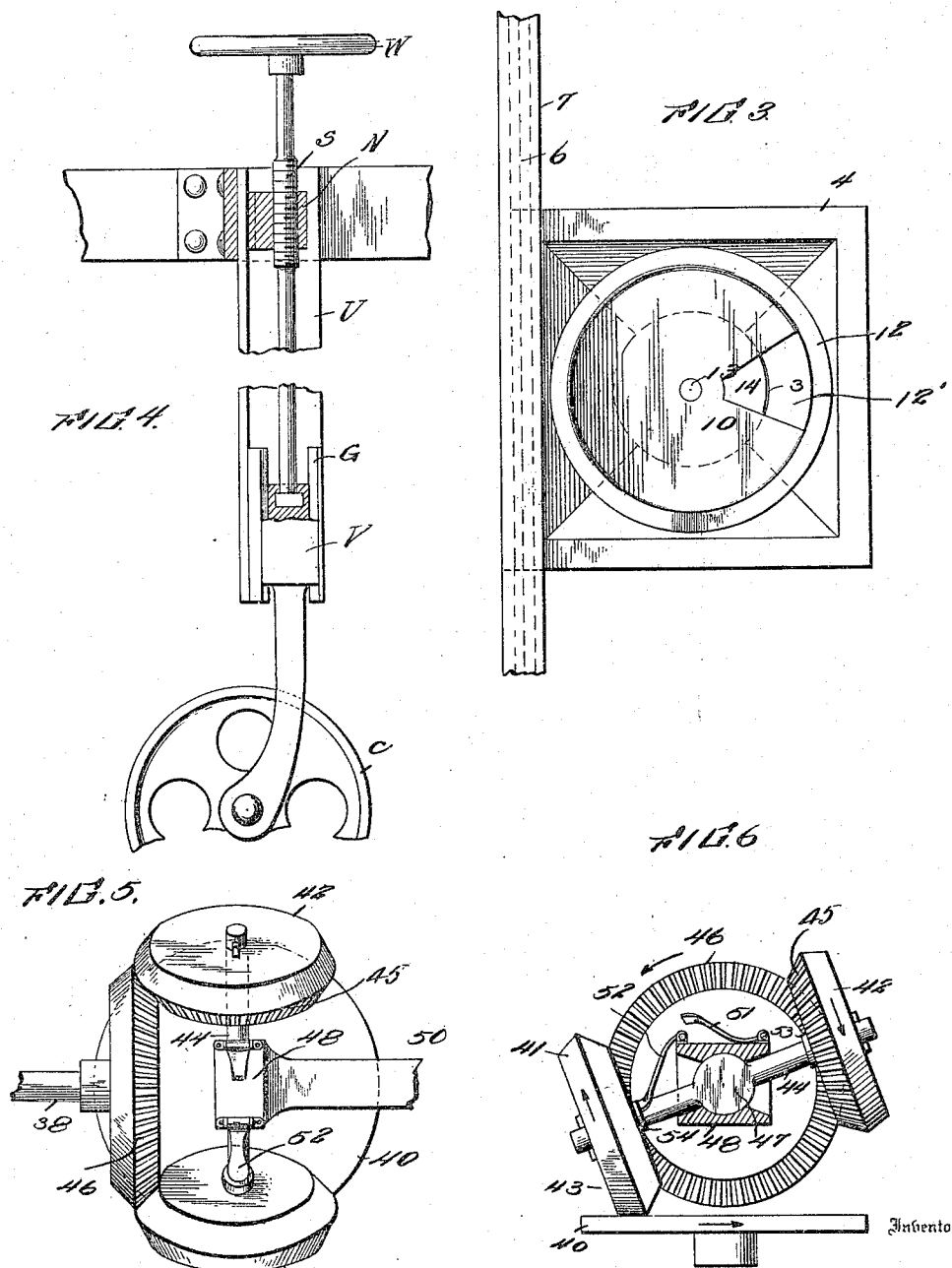

UNITED STATES PATENT OFFICE.

JUSTUS O. FRAISHER, OF SEATTLE, WASHINGTON.

MACHINE FOR SPREADING ASPHALT, &c.

1,193,459.  Specification of Letters Patent.  Patented Aug. 1, 1916.

Application filed May 11, 1915. Serial No. 27,430.

*To all whom it may concern:*

Be it known that I, JUSTUS O. FRAISHER, a citizen of the United States, residing at Seattle, in the county of King and State of Washington, have invented certain new and useful Improvements in Machines for Spreading Asphalt, &c.; and I do hereby declare the following to be a full, clear, and exact description of the invention, such as will enable others skilled in the art to which it appertains to make and use the same.

This invention relates to coating machines, and more especially to those employing a fountain and a scraper; and the object of the same is to produce an improved machine for spreading asphalt, cement and other plastic materials on a surface such as a roof, floor, street, pavement and the like and leveling or smoothing the same by rubbing and scraping the material as it is applied.

To this end the invention consists in an upright fountain to which the material is fed and which automatically delivers it to the scraper or rubber, a carriage or vehicle supporting the fountain, means for reciprocating the latter transversely of the carriage automatically, and automatic mechanism for causing the lateral movements to take place when the material has attained the desired thickness.

The machine is capable of being driven mechanically or transported by other power, and its preferred details of construction are set forth in the following specification and claims and are shown in the drawings wherein:

Figure 1 is a vertical longitudinal sectional view, this figure alone being employed to indicate diagrammatically how a power plant or motor might be used to propel the machine, and this view also showing how means might be employed to adjust the height of the delivery box and shoe. Fig. 2 is a front elevation. Fig. 3 is an enlarged bottom plan view of the box and shoe. Fig. 4 is an enlarged sectional detail of one of the caster wheels and the means for adjusting it vertically. Fig. 5 is an enlarged plan view of the reversing mechanism I preferably employ, and Fig. 6 is a sectional detail of the same.

In the drawings, and more especially in Fig. 1, the vehicle or carriage is shown as comprising a main frame M which includes uprights U, the front uprights having driving wheels D and the rear uprights (which are not at the rear extremities of the framebar) having caster wheels C. These may well be mounted in blocks V adjustable vertically on guides G in their uprights by any suitable means such as a screw S swiveled in the block and passing through a nut N, and a hand wheel W at the upper end of each screw. Obviously the rotation of these wheels depresses or elevates their caster wheels and therefore raises or lowers the rear end of the frame-bars whereby the spreading mechanism carried thereby in a manner yet to be explained may be adjusted by an operator standing on the top of the framework. The letter P designates a suitable power plant such, for instance, as an electric motor mounted on a framework, and in Fig. 1 I have diagrammatically shown propelling means for the machine such as a belt B connecting this motor with the axis of the driving wheels D and a belt tightener T to throw the same into action. However, it is quite possible that a team could be hitched to the vehicle to draw the same over the surface being treated or to transport the machine from point to point, and if this machine be employed in spreading asphalt on inclined roofs instead of on a flat surface as shown in Fig. 1, its driving wheels will be disposed toward the lower edge of the roof so that it will automatically travel down the same when the chock blocks K are moved. Also the drawings show a hopper H into which the material is to be fed from any suitable source or which might be made large enough to carry a charge of sufficient size to cover the entire roof, and a feed mechanism F conveying the material positively and regularly from this hopper to the fountain. I lay no claim to the parts thus far described, as they might be omitted or varied to a wide extent without affecting the operation of the spreading machine itself. The hopper and feed are to be considered as shown diagrammatically only, because if this machine is used to lay cement streets or walks it is quite possible that the feed will be a long tube extending for some distance forward of the frame M so that wagons may bring the mixed concrete from time to time and unload it into the hopper. On the other hand, if the machine be small and comparatively light so that it may be used on roofs, it is quite possible that the hopper could be of sufficient size to contain all the material needed for one roof. Considerable latitude must be allowed the manufacturer in respect to these features of the machine which are not considered parts of the invention.

The rear ends of the frame-bars are connected by horizontal transverse rods or tracks 1 which extend the full width of the machine, and on these tracks move guides or eyes 2 which project from an upright fountain, the latter having a cylindrical body 3 with whose upper end the feed mechanism F communicates at a suitable point, about as illustrated in Fig. 1. The lower end of the body 3 carries a box 4, preferably square as seen in Fig. 3 and with its walls converging upward to and united with the fountain body as seen in Fig. 1; and along the lower edge of the front side of this box is formed a tongue 5 which is slidable in a groove 6 formed in a shoe 7. The latter is a bar whose length is equal to or greater than the full width of the machine as seen in Fig. 2, and whose purpose is to lie on the surface to be treated and bridge depressions therein so as to support the box above the high points in such surface. If the machine be employed in laying a street pavement, it may be that its surface will be arched or crowned slightly, in which case the lower or working face of this bar will be given a corresponding configuration. It is obvious that when this end of the machine is raised off the ground, the bar can be drawn longitudinally out of engagement with the box, and one of suitable length and configuration substituted. By the word length I mean that it is quite possible to have the bar longer than the width of the machine so as to extend, for instance, from the line of the curb to the line of the nearest street car track or to the center of a street, or possibly even from curb to curb if the machine is built on a sufficiently large scale.

A round tamper or head 10 is mounted within and of slightly less diameter than the internal width of the box 4, and around its edge this head has its corners beveled off so that its upper side is partly conical as seen at 11 and its lower corner is under-cut as at 12. The head is cut out at one side as at 12' and it is centrally mounted fast on the lower end of an upright shaft 13 which stands along the axis of the fountain 3, which shaft may carry a worm 14 to assist the downward movement of the material within the fountain as explained below. At the upper end of the latter is a bearing 15 in which the shaft is slidably and rotatably mounted, and which also serves as a support for a worm gear 16 which is splined on the shaft as seen at 17. Mounted in suitable bearings 18 carried by brackets 19 rising from the frame is a shaft 20 having a worm 21 engaging said gear, and in Figs. 1 and 2 I have shown one end of this shaft as having a pulley 22 connected by a sprocket or belt 23 with the driving wheel 24 on the motor P, although it is quite obvious that any suitable means may be employed for rotating the main shaft 20. In these views also I have shown belt and pulley connections 25 between this shaft and another shaft 26 which latter is suitably connected with a worm 27 within the feed tube F. However, the use of this detail is optional and will depend considerably on the inclination of said feed tube and other conditions not necessary to amplify. Although the head 10 has considerable weight, it is possible to form a collar 28 on the upright shaft 13 and permit a weighted lever 29 to rest thereon so that, by adjusting the position or size of the weight 30, the pressure of the head upon the material being spread may be regulated.

Fixedly mounted across the rear end of the frame-bars of the main framework is a rack bar 31, and the fountain body 3 may have guides 32 slidably engaging said bar. Mounted in bearings 33 on said body is a feed shaft 34 whose lower end has a gear 35 meshing with said rack and whose upper end is shown as provided with a beveled gear 36 meshing with a beveled pinion 37 fast on an overhead shaft 38 mounted in suitable bearings 39 carried by brackets which rise from the fountain.

One of the objects of this invention is to cause the automatic travel of the fountain and spreader to and fro across the rear end of the framework as conditions require. By this I mean that when the material has attained the proper height at one point, the rotating head 10 and its shaft 13 are of course raised and it becomes desirable to move the box and head to another point, where the material is not yet sufficiently thick. Accordingly I employ the rising and falling movements of the shaft 13 in connection with its constant rotation, as the means for driving the overhead shaft which latter, through gear 36 and pinion 37, drives the feed shaft while this, in turn, causes the travel of the gear 35 along the rack bar 31. While any suitable and appropriate mechanism may be used for performing this service, I prefer to use the connection which is perhaps best seen in Figs. 5 and 6 or some equivalent thereof which would cause the automatic lateral movement of the fountain, leaving the operator with the duty only of reversing this lateral movement when the spreading mechanism has reached one extreme.

On the upper end of the shaft 13 is mounted a friction disk 40 adapted to make contact with the friction surface 41 of either of a pair of wheels 42 and 43 which are mounted on the opposite ends of a rocking shaft 44. The wheel 42 has also a gear surface 45 adapted to mesh with a gear 46 which is fast on the rear end of the overhead shaft 38 but out of contact with the friction disk 40. At its center the shaft 44 carries a ball 47 loosely mounted within a socket 48 in such manner that it may rock therein around a point in line with the projected axis of the overhead shaft 38, and the parts of this socket are carried by a bracket arm 50. As above stated, I propose to rock this shaft manually, and if so I may employ manual means for holding it in either of its extreme positions. As shown I have two pawls or dogs 51 and 52 which are hinged to the socket 48 and whose outer extremities are adapted to engage collars 53 and 54 respectively on the rocking shaft 44 near the wheels 42 and 43. Fig. 6 shows the dog 52 in action and the dog 51 thrown up onto the upper portion of the socket 48, and in this case the wheel 43 has its friction surface 41 depressed into contact with the disk 40.

I will describe the operation of this machine in its fullest capacity, as when used for laying a concrete street. The hand wheels W are turned to move the caster wheels C downward and therefore to elevate the rear end of the machine, so that the latter can be propelled or drawn to its point of use and the spreading mechanism will not touch the ground. A charge of plastic material is fed into the hopper H, and if this be comparatively small it will be necessary to continue feeding the mixed concrete thereto. The operator takes his place on the top of the main framework M and throws out the propelling mechanism as by loosening the belt tightener T, and some or all of the wheels may be chocked as at K, or the chock blocks may be omitted if the machine is mechanically propelled. The motor P having been started, power is communicated to the main shaft 20 and by its worm to the worm gear 16, and the latter rotates the upright shaft 13 and the feed worm 14 if one be employed. Material delivered down the tube F into the fountain is therefore forced down within the latter into the box 4, and it accumulates on the top of the head 10 until it falls over the conical edge 11 thereof as the corners of the square box permit, or through opening 12'. Dropping onto the surface to be coated, the material is spread by the rotary rubbing action of the heavy head 10, perhaps increased by the weight 30. More material follows that first fed, and finally the surface coating at this point becomes sufficiently thick. Meanwhile the head and its shaft are raised by the material, and eventually the disk 40 comes into contact with the friction surface on one of the wheels 42 or 43 and causes the shaft 44 to rotate. This through the gear surface 45 turns the gear 46 and the overhead shaft 38, and the latter through the connections described turns the gear 30 in mesh with the rack 31 so that the entire fountain is caused to travel a short distance along the tracks 1, 1. The head 10 now passes off the high point where the material has been spread and descends slightly, when the friction disk 40 immediately drops out of contact with the friction surface 41 and the transverse movement of the fountain ceases. This operation is continued for the full width of the street or surface being covered; and when one side edge of the same is reached, the operator throws up the dog 52 and turns down the dog 51 so that the rocking shaft 44 stands at an inclination opposite from that seen in Fig. 6, and thereafter the action of the machine will be the same excepting that the fountain will move transversely across the frame M in the other direction. With the fountain moves box 4 which, on account of its sliding connection with the shoe 7, must travel in a straight horizontal line or in a line conforming with the crown of the street; and hence it is possible to lay a concrete pavement on a base which is quite irregular, because the shoe bridges the low spots and the head and disk will not rise to the point shown in Fig. 1 until depressions are filled up to the proper level. Having laid a strip across the street, the chock blocks K are now moved if they have been employed, and the entire machine drawn forward; or if the machine is mechanically propelled, the operator can cause it to move forward by throwing in the propelling mechanism. In such forward movement the rear side of the box gives a final scraping and finishing action to the surface already laid, and with some materials it may therefore be important that the lower face of this box be given a construction which shall have this end in view. From this description it will be clear that if the machine be employed for laying asbestos on roofs the same operation will be followed excepting that, in that case, the entire structure will be lighter and smaller and no propelling means are necessary because the machine would automatically travel down the roof whenever the chock blocks were moved forward. The use of caster wheels is obviously to permit the machine to turn corners, and the use of the mechanism for adjusting these wheels is for the purpose not only of lifting the spreading mechanism off the ground but also for adjusting the thickness laid as desired.

What I claim is:

1. In a machine for spreading plastics, the combination with a main framework having uprights at its front corners and at about the mid-length of its sides, wheels carried by the front uprights, caster wheels movably mounted in the other uprights, and means for adjusting them vertically; of transverse tracks carried by the rear ends of the frame-bars, spreading mechanism including an upright fountain movably mounted on said tracks, means for sliding it thereon, a tamper mounted on an upright shaft within said fountain, and means for rotating said shaft.

2. In a machine for spreading plastics, the combination with a main framework having supporting wheels at its front corners, caster wheels movably mounted in the framework at other points, and means for adjusting them vertically; of transverse tracks carried by the rear end of the framework, spreading mechanism including an upright fountain movably mounted on said tracks and a rotary tamper mounted on an axial shaft within said fountain, a rack bar across the rear end of said main frame, a gear engaging this bar, a feed shaft journaled on the fountain and carrying said gear, and means for throwing said shafts into connection with each other.

3. In a machine for spreading plastics, the combination with a vehicle, spreading mechanism including an upright fountain mounted on and movable laterally across said vehicle, and a rotary tamper mounted on an axial shaft within said fountain; of a rack bar across the vehicle, a gear engaging therewith, an upright feed shaft journaled in bearings on said fountain and carrying said gear, and means for throwing said shafts into connection with each other.

4. In a machine for spreading plastics, the combination with a vehicle, spreading mechanism including an upright fountain mounted on and movable laterally across said vehicle, and a rotary tamper mounted on an axial shaft within said fountain; of a rack bar across the vehicle, a gear engaging therewith, an upright feed shaft journaled in bearings on said fountain and carrying said gear, means for rotating said tamper shaft, driving mechanism for the other shaft, and means for throwing the driving mechanism into connection with the tamper shaft.

5. In a machine for spreading plastics, the combination with a vehicle, spreading mechanism including an upright fountain mounted on and movable laterally across said vehicle, and a rotary tamper mounted on an axial shaft within said fountain; of a rack bar across the vehicle, a gear engaging therewith, an upright feed shaft journaled in bearings on said fountain and carrying said gear, driving mechanism for said tamper shaft, a disk on its upper end, driving mechanism for said other shaft, a rocking shaft pivoted above said disk, wheels thereon adapted for selective contact with said disk, and connections between said wheels and feed shaft.

6. In a machine for spreading plastics, the combination with a vehicle, spreading mechanism including an upright fountain mounted on and movable laterally across said vehicle, and a rotary tamper mounted on an axial shaft within said fountain; of a rack bar across the vehicle, a gear engaging therewith, an upright feed shaft journaled in bearings on said fountain and carrying said gear, driving mechanism for said tamper shaft, a disk on its upper end, a rocking shaft pivoted above said disk, wheels fast thereon having friction surfaces adapted for selective contact with said disk at opposite sides of its center, an overhead shaft connected with said feed shaft, and gearing connecting the overhead shaft with said rocking shaft.

7. In a machine for spreading plastics, the combination with a vehicle, spreading mechanism including an upright fountain mounted on and movable laterally across said vehicle, and a rotary tamper mounted on an axial shaft within said fountain; of means for moving the spreading mechanism laterally of the vehicle, a feed tube opening into the fountain near its upper end, feeding devices within said tube, a main shaft rotated from a source of power, connections between it and the tamper shaft, and connections between said main shaft and feeding devices.

8. In a machine for spreading plastics, the combination with an upright tubular fountain mounted on a suitable vehicle and having a square conical box communicating with its lower end, a heavy round tamper head within said box, a tamper shaft rising rigidly therefrom and slidably and rotatably mounted in bearings carried by the fountain, and a driving gear splined on said shaft; of a main shaft mounted in bearings and having a worm in constant engagement with said gear, a feed worm carried by said tamper shaft within the fountain, and means for communicating power to said main shaft.

9. In a machine for spreading plastics, the combination with an upright tubular fountain mounted on a suitable vehicle and having a box communicating with its lower end, a tamper head within said box, a tamper shaft rising rigidly therefrom and slidably and rotatably mounted in bearings carried by the fountain, and a driving gear splined on said shaft; of a main shaft mounted in bearings and having a worm in constant engagement with said gear, and means for communicating power to said main shaft.

10. In a machine for spreading plastics, the combination with an upright fountain movably carried by a suitable support and having its lower end flared downwardly into a polygonal box; of an upright tamper shaft slidably and rotatably mounted along the axis of said fountain, means for rotating it, and a round tamper head fast on the lower end of said shaft and smaller than the interior of said box, its upper and lower corners being cut away for the purpose set forth.

11. In a machine for spreading plastics, the combination with an upright fountain movably carried by a suitable support, a square box having downwardly flaring walls, its upper end communicating with said fountain and the front side of its lower end having a transverse tongue, and a long shoe adapted to rest on the surface to be treated and having a groove slidingly engaging said tongue; of a round tamper head within said box, a tamper shaft rising fixedly therefrom and slidably and rotatably mounted in bearings along the axis of said fountain, means for rotating said shaft, and means for depressing the same.

12. In a machine for spreading plastics, the combination with an upright fountain movably carried by a suitable support, a square box having downwardly flaring walls, its upper end communicating with said fountain and the front side of its lower end having a transverse tongue, and a long shoe adapted to rest on the surface to be treated and having a groove slidingly engaging said tongue; of a round heavy tamper head rotatably mounted within said box, a tamper shaft rising therefrom, mechanism for feeding the fountain transversely of the vehicle and the box along said shoe, and means actuated by the rise of the tamper shaft for throwing said feeding mechanism into action.

13. In a machine for spreading plastics, the combination with an upright fountain movably carried by a suitable support, and a square box having downwardly flaring walls, its upper end communicating with said fountain; of a round heavy tamper head rotatably mounted within said box, a tamper shaft rising therefrom, mechanism for feeding the fountain transversely of the vehicle, and means actuated by the rise of the tamper shaft for throwing said feeding mechanism into action.

14. The combination with an upright shaft having a friction disk at its upper end, and a horizontal shaft having a gear standing above and out of contact with said disk; of a rocking shaft mounted on a pivot over the center of the disk, and wheels on the ends of said rocking shaft, each having a friction surface adapted to engage the disk and one of them having a gear surface in constant mesh with said gear.

In testimony whereof I affix my signature in presence of two witnesses.

JUSTUS O. FRAISHER.

Witnesses:
G. WARD KEMP,
JNO. E. RICHARDSON.

Copies of this patent may be obtained for five cents each, by addressing the "Commissioner of Patents, Washington, D. C."